US012367716B2

United States Patent
Daniel et al.

(10) Patent No.: US 12,367,716 B2
(45) Date of Patent: Jul. 22, 2025

(54) VEHICLE MANAGING SYSTEM FOR MANAGING VEHICLES TO BE TESTED-CONFIGURED AND METHOD THEREOF

(71) Applicant: Ford Global Technologies, LLC, Dearborn, MI (US)

(72) Inventors: Jesudoss Daniel, Kanata (CA); Jamal Alezzani, Belleville, MI (US); Jason Michael Miller, Woodhaven, MI (US); John Cardillo, Windsor (CA); Jeffrey Daugherty, Canton, MI (US); Christina Metcalf, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 17/572,814

(22) Filed: Jan. 11, 2022

(65) Prior Publication Data

US 2023/0222845 A1 Jul. 13, 2023

(51) Int. Cl.
*G07C 5/00* (2006.01)
*G06F 9/445* (2018.01)
*G06F 9/48* (2006.01)
*H04B 17/318* (2015.01)

(52) U.S. Cl.
CPC ......... *G07C 5/008* (2013.01); *G06F 9/44505* (2013.01); *G06F 9/4881* (2013.01); *H04B 17/318* (2015.01)

(58) Field of Classification Search
CPC ... G07C 5/008; H04B 17/318; G06F 9/44505; G06F 9/4881
See application file for complete search history.

(56) References Cited

U.S. PATENT DOCUMENTS

| 4,742,357 A | * | 5/1988 | Rackley | G01S 5/10 340/8.1 |
| 6,728,603 B2 | | 4/2004 | Pruzan et al. | |
| 9,323,546 B2 | | 4/2016 | Rork et al. | |
| 10,834,206 B2 | | 11/2020 | Acharya et al. | |
| 2009/0168742 A1 | * | 7/2009 | Sumcad | G01D 21/00 340/901 |
| 2017/0171834 A1 | * | 6/2017 | Neves | H01Q 1/52 |

(Continued)

FOREIGN PATENT DOCUMENTS

CN 108764796 11/2018

*Primary Examiner* — Anne Marie Antonucci
*Assistant Examiner* — Luis G Del Valle
(74) *Attorney, Agent, or Firm* — Burris Law, PLLC

(57) ABSTRACT

A system includes a vehicle managing system (VMS) and a task managing system (TMS). The VMS is configured to communicate to a selected vehicle and is configured to include a vehicle connection module (VCM) and a task allocation module (TAM). The VCM is configured to identify the selected vehicle based on a vehicle identifier of the selected vehicle. The TAM is configured to obtain a task order associated with the selected vehicle, where the task order defines one or more tasks to be performed on the selected vehicle. The TMS includes multiple task execution controllers (TECs) and a task scheduling controller (TSC). The TAM of the VMS is configured to provide the task order for the selected vehicle to the TSC, and the TSC is configured to assign the task order to a selected TEC, which executes the task order for the selected vehicle.

20 Claims, 4 Drawing Sheets

(56) References Cited

U.S. PATENT DOCUMENTS

| | | | |
|---|---|---|---|
| 2019/0108010 A1* | 4/2019 | Tillman | H04L 67/12 |
| 2019/0276055 A1* | 9/2019 | Cooper | B60L 15/34 |
| 2019/0327690 A1* | 10/2019 | Ameixieira | H04W 52/226 |
| 2020/0310426 A1* | 10/2020 | Bhat | B60W 50/00 |
| 2021/0311522 A1* | 10/2021 | Vlacich | G05D 1/0077 |
| 2022/0164747 A1* | 5/2022 | Shah | G01C 21/3676 |
| 2023/0025795 A1* | 1/2023 | Tourian | G01S 19/47 |

* cited by examiner

VEHICLE MANAGING SYSTEM FOR MANAGING VEHICLES TO BE TESTED-CONFIGURED AND METHOD THEREOF

CROSS-REFERENCE TO RELATED APPLICATIONS

This application is related to copending applications filed concurrently herewith titled "TASK MANAGING SYSTEM FOR TESTING-CONFIGURING VEHICLES BASED ON A TASK ORDER AND METHOD THEREOF", as filed in U.S. patent application Ser. No. 17/572,818 on Jan. 11, 2022, and "TASK MANAGING SYSTEM HAVING MULTIPLE TASK EXECUTION CONTROLLERS FOR TESTING-CONFIGURING VEHICLES AND METHOD THEREOF", as filed in U.S. patent application Ser. No. 17/572,819 on Jan. 11, 2022, which are commonly assigned with the present application and the contents of which are incorporated herein by reference in their entireties.

FIELD

The present disclosure relates to a system and method for testing and configuring multiple vehicles.

BACKGROUND

The statements in this section merely provide background information related to the present disclosure and may not constitute prior art.

Vehicles typically go through various testing and system configuration during their life. For example, over the years, vehicle manufacturing facilities have conducted end-of-line diagnostic testing and system configuration on vehicles. To conduct such tasks, a diagnostic tool is physically positioned and located at the end of the manufacturing line and, using a tethered approach, an operator physically plugs the diagnostic testing tool into a connector of a vehicle. Communicating with a vehicle communication network (e.g., a controller area network (CAN)), the diagnostic tool executes tests and software configurations within a period of time. This approach provides one diagnostic tool to one vehicle configuration.

The tethered approach typically provides a limited number of diagnostic tools, which in turn limits the number of vehicles that can be processed during a given period of time. Additionally, due to each tool being physically positioned at the end of the line, the testing and configuration can be limited to the end of the manufacturing line. These issues related to vehicle diagnostics and system configurations, among other issues related to testing and configuring vehicle are addressed by the present disclosure.

SUMMARY

This section provides a general summary of the disclosure and is not a comprehensive disclosure of its full scope or all of its features.

In one form, the present disclosure is directed to a system that includes a vehicle managing system (VMS) and a task managing system. The VMS is configured to communicate to a selected vehicle among one or more vehicles. The VMS includes a processor configured to execute instructions stored in a nontransitory computer-readable medium to operate as a vehicle connection module and a task allocation module. The vehicle connection module is configured to identify the selected vehicle based on a vehicle identifier of the selected vehicle. The task allocation module is configured to obtain a task order associated with the selected vehicle, where the task order defines one or more tasks to be performed on the selected vehicle. The task managing system includes a plurality of task execution controllers and a task scheduling controller. The task allocation module of the VMS is configured to provide the task order for the selected vehicle to the task scheduling controller. The task scheduling controller is configured to assign the task order to a selected task execution controller from among the plurality of task execution controllers based on availabilities of the plurality of task execution controllers. The selected task execution controller is configured to execute the task order for the selected vehicle.

In some variations, the vehicle connection module is further configured to process an introduction signal associated with the one or more vehicles, where the introduction signal includes data indicative of the vehicle identifier for a respective vehicle, and to authenticate the vehicle identifier for the selected vehicle based on the introduction signal associated with the selected vehicle and data from a vehicle information database, where the vehicle information database is configured to store data related to the one or more vehicles including the vehicle identifier and the task order. In some variations, the vehicle managing system is configured to communicate with the selected vehicle via wireless communication link, and the vehicle connection module is further configured to determine a communication quality of the wireless communication link with the selected vehicle, and output a corrective control in response to the communication quality being abnormal. The communication quality of the wireless communication link includes a signal strength of the selected vehicle. In some variations, the vehicle connection module is further configured to, as the corrective control, disconnect communication with the selected vehicle via the wireless communication link and establish another wireless communication link with the selected vehicle, generate a report including information regarding the wireless communication link being abnormal, or a combination thereof. In some variations, the task scheduling controller is configured to provide data indicative of an operation state of the task managing system to the VMS. The processor of the VMS is further configured to operate as a performance module configured to determine occurrence of an abnormal operation of the task managing system based on the operations state of the task managing system, and execute a corrective action in response to the abnormal operation of the task managing system. In some variations, the data of the operation state includes data regarding an operation state of the task scheduling controller, an operation state of the task execution controllers, a state of the execution of the task order of the selected vehicle, or a combination thereof. in some variations, the processor of the VMS is further configured to operate as a role verification module configured to provide a role identification information to identify the VMS as a primary system or an auxiliary system to the task scheduling controller. In some variations, the role verification module is configured to receive a role notification including information identifying the VMS as one of the primary system or the auxiliary system from the task scheduling controller, the task allocation module is configured to provide the task order for the selected vehicle to the task scheduling controller in response to being the primary system, and the role verification module is configured to have the VMS in a wait mode in response to the VMS being the auxiliary system. In some variations, the processor of the VMS is further configured to operate as error detection module that is configured to determine whether at least one of the vehicle identifier, an internet protocol address, or a combination thereof for the selected vehicle changed since establishing a wireless communication link with the selected vehicle, and output a corrective action based on an identified change in the vehicle identifier, the internet protocol address, or the combination thereof. In some variations, the VMS is further configured to operate as an error detection module that is configured to determine whether the vehicle identifier of the selected vehicle is the same as a second vehicle from among the one or more of vehicles, and inhibit execution of the task order in response to the vehicle identifier of the selected vehicle and the second vehicle being the same.

In one form, the present disclosure is directed to a method of managing one or more vehicle to be tested-configured, the method includes establishing, by a vehicle managing system (VMS), a communication link with a selected vehicle among the one or more vehicles, identifying, by the VMS, the selected vehicle based on a vehicle identifier of the selected vehicle, and obtaining, by the VMS, a task order associated with the selected vehicle, where the task order defines one or more tasks to be executed on the selected vehicle. The method further includes providing, by the VMS, the task order for the selected vehicle to a task scheduling controller, assigning, by the task scheduling controller, the task order to a selected task execution controller from among a plurality of task execution controllers based on availabilities of the plurality of task execution controllers, where each of the plurality of task execution controllers is configured to wirelessly communicate with a set of vehicles from among the one or more vehicles, and executing, by the selected task execution controller, the task order for the selected vehicle.

In some variations, the method further includes detecting, by the VMS, an introduction signal associated with the one or more vehicles, where the introduction signal includes data indicative of the vehicle identifier for a respective vehicle, and authenticating, by the VMS, the vehicle identifier of the selected vehicle based on the introduction signal associated with the selected vehicle and data from a vehicle information database, where the vehicle information database is configured to store data related to the one or more vehicles including the vehicle identifier and the task order. In some variations, the method further includes determining, by the VMS, a communication quality of the wireless communication link with the selected vehicle, where the communication quality of the wireless communication link includes a signal strength, and outputting a corrective control in response to the communication quality being abnormal. In some variations, outputting the corrective control further comprises at least one of disconnecting communication with the selected vehicle via the wireless communication link and establishing, by the VMS, another wireless communication link with the selected vehicle, or generating, by the VMS, a report including information regarding the wireless communication link being abnormal. In some variations, the method further includes providing, by the VMS, a role identification information to identify VMS as a primary system or an auxiliary system to the task scheduling controller. In some variations, the method further includes obtaining, by the VMS, a role notification including information identifying the VMS as one of the primary system or the auxiliary system from the task scheduling controller, where the VMS provides the task order for the selected vehicle in response to being the primary system, and operating, by the VMS, in a wait mode in response to the VMS being the auxiliary system. In some variations, the method further includes determining, by the VMS, whether at least one of the vehicle identifier or an internet protocol address for the selected vehicle changed since establishing the wireless communication link with the selected vehicle, and outputting, by the VMS, a corrective action based on an identified change in the vehicle identifier, the internet protocol address, or the combination thereof. In some variations, the method further includes determining, by the VMS, whether the vehicle identifier of the selected vehicle is the same as a second vehicle from among the one or more of vehicles, and inhibiting, by the VMS, execution of the task order in response to the vehicle identifier of the selected vehicle and the second vehicle being the same.

In one form the present disclosure is directed to a system that includes a vehicle managing system (VMS) and a task managing system. The VMS configured to wirelessly communicate to one or more vehicles via one or more wireless communication link. The VMS includes a processor configured to execute instructions stored in a nontransitory computer-readable medium to operate as a vehicle connection module and a task allocation module. The vehicle connection module is configured to process an introduction signal associated with the one or more vehicles and identify a selected vehicle among the one or more vehicles based on the introduction signal and data from a vehicle information database, where the introduction signal includes data indicative of the vehicle identifier for a respective vehicle and the vehicle information database is configured to store data related to the one or more vehicles including the vehicle identifier and a task order. The task allocation module is configured to obtain the task order associated with the selected vehicle from the vehicle information database, where the task order defines one or more tasks to be executed on the selected vehicle. The task managing system includes a plurality of task execution controllers and a task scheduling controller. The task allocation module is configured to provide the task order for the selected vehicle to the task scheduling controller. Each of the plurality of task execution controllers is configured to wirelessly communicate with a set of vehicles from among the one or more vehicles. The task scheduling controller is configured to assign the selected vehicle to a selected task execution controller from among the plurality of task execution controllers based on availabilities of the plurality of task execution controllers. The selected task execution controller is configured to execute the one or more tasks of the task order on the selected vehicle.

In some variations, the processor of the VMS is further configured to operate as an error detection module that is configured to determine whether the vehicle identifier of the selected vehicle is the same as a second vehicle from among the one or more of vehicles, and inhibit execution of the task order in response to the vehicle identifier of the selected vehicle and the second vehicle being the same.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
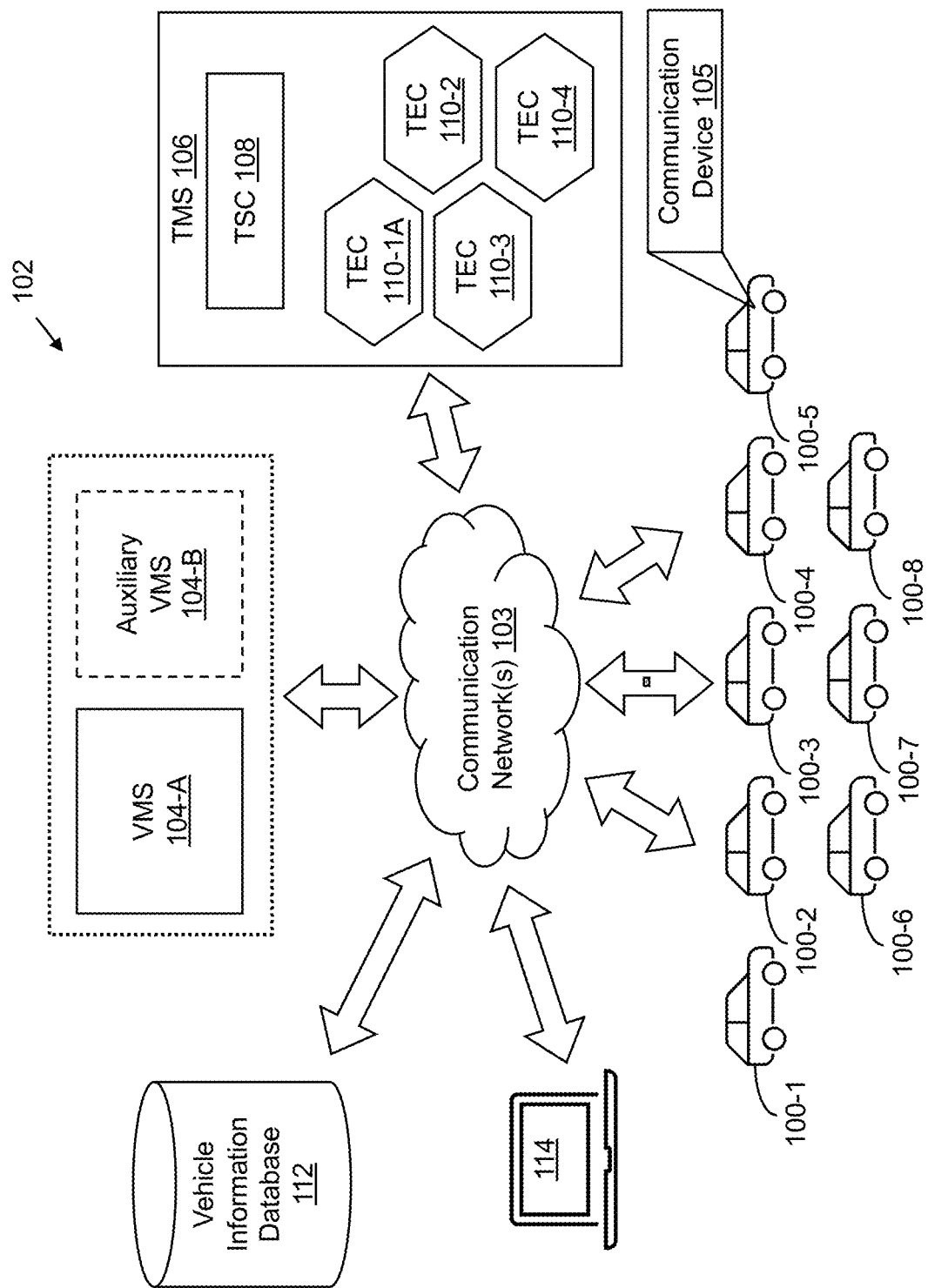
FIG. 1 illustrates an example system in communication with multiple vehicles and devices, accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Vehicles may be equipped with wireless communication devices that establish wireless communication links with external devices that may perform diagnostics, tests, software configuration, among other tasks. In a non-limiting example, such a wireless communication link may be based on diagnostic over internet protocol (DoIP). Execution of the various tasks can be challenging due to, for example, the number of vehicles, the different types of vehicles, the variation in tasks based on the vehicle type, among other factors.

The present disclosure provides a system for automatically scheduling and executing defined tasks for respective vehicles using wireless communication. More particularly, the system includes a vehicle management system (VMS) for identifying the vehicles and a task managing system (TMS) for executing tasks defined in a task order for the vehicle. The VMS is configured to establish communication with the vehicles and verify the identity of the vehicle. After verification, the VMS takes inventory of the vehicles by storing information related to the vehicle, such as vehicle identifier (e.g., vehicle identification number (VIN)), communication address (e.g., IP address), among other information. As described herein, the VMS is further configured to monitor the wireless communication link with the vehicle for possible errors and check-in with the TMS to detect an operation state of the TMS and more particularly, the execution of the tasks. Without being limited to one-to-one tethered diagnostic tool, the system of the present disclosure processes and manages multiple vehicles at a time improving the efficiency of the testing-configuration of the vehicles while increasing the scheduling flexibility of the execution of the tasks since the vehicles may wirelessly communicate at various stages of, for example, assembly process.

Referring to FIG. 1, in an example application, vehicles 100-1 to 100-8 (collectively "vehicles 100") provided in a manufacturing facility are configured to communicate with a system 102 that is configured to execute a defined set of software driven tasks on the vehicle 100. In a non-limiting example, the tasks may include one or more vehicle software configurations, one or more software configuration updates, one or more tests, and/or one or more diagnostics, among other tasks (e.g., the vehicle may undergo two software updates and one test, or one system configuration). In one form, the vehicle 100 and the system 102 are configured to communicate via one or more communication networks 103 that employs wireless and/or wired communication links. Various wireless communication links may be employed such as, but not limited to, transmission control protocol (TCP), Internet protocol (IP), cellular protocols, among others. In a non-limiting example, in using TCP/IP, the vehicle 100 are configured to employ DoIP. Accordingly, the vehicles 100 and the system 102 include software and/or hardware components (e.g., routers, transmitters, microprocessors, memory, among other components) for establishing the communication link. In addition, the facility may include gateway servers, routers, transmitters, antenna, interface ports, among other components for supporting the communication network 103. It should be readily understood that the system 102 for testing-configuring the vehicles 100 may be employed in other applications, such as at a vehicle service facility, and should not be limited to a manufacturing facility.

In one form, each vehicle 102 includes a communication device 105 that is configured to communicate with external devices via wired and/or wireless communication using one or more of the communication methods described above. The communication device 105 is configured to broadcast an introduction signal that includes data to uniquely identify the vehicle. In a non-limiting example, the data can include a vehicle identifier for the vehicle (e.g., VIN), an entity identification (EID), and a communication identification (ID) (e.g., IP address). In one form, the communication device 105 is further configured to communicate with other devices/modules within the vehicle 102 via a vehicle communication network (not shown), such as CAN. Accordingly, the system 102 is able to establish a communication link with the vehicle 102 to manage and execute defined set of tasks for the vehicle, as described herein.

The system 102 includes a vehicle managing system (VMS) 104 and a task managing system (TMS) 106 having a task scheduling controller (TSC) 108 and a plurality of task execution controllers (TEC) 110-1 to 110-4 (collectively "TEC 110"). In an example application, the system 102 having the VMS 104 and the TMS 106 include one or more servers provided at the same or distributed at different locations (e.g., via one or more edge computing devices) and communicably coupled accordingly.

The VMS 104 is configured to communicate with the vehicles 100 and with the TSC 108 of the TMS 106 to assign the vehicles 100 to the TMS 106, which is configured to perform the tasks associated with each of the vehicles 100. In addition to the TMS 106 and the vehicles 100, the VMS 104 is configured to communicate with a vehicle information database 112 that stores information associated with the vehicles 100. More particularly, the vehicle information database 112 is configured to store a vehicle identifier for each of the vehicles 100 and a corresponding task order for the vehicle. In one form, the vehicle identifier is a unique character string for identifying the vehicle. In one form, the task order includes information related to the vehicle 100 (e.g., the vehicle identifier, vehicle make, vehicle model, vehicle year, among other information) and one or more tasks to be performed on the vehicle 100.

In one form, a human user may communicate with the system 102 via a computing device 114 to, for example, track the progress of the vehicle 100 and tasks being performed. In addition, the components of the system 102, such as the VMS 104, TMS 106, are able to notify the user of any errors and the user is able to access data stored by the system 102.

Figure 2:
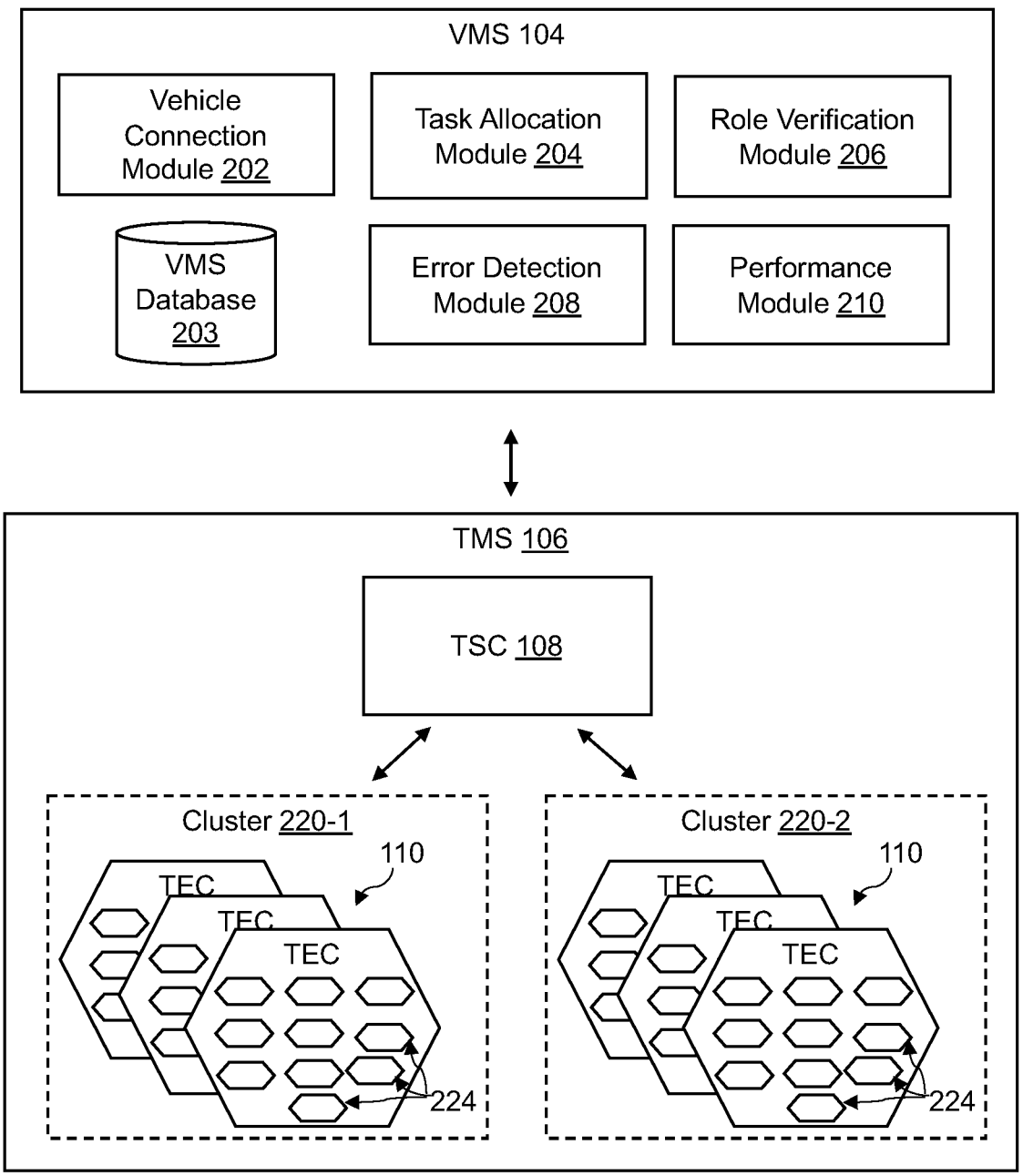
FIG. 2 is a block diagram of an example vehicle managing system of the system, in accordance with the teachings of the present disclosure.

Referring to FIG. 2, the VMS 104 is configured to include a vehicle connection module 202, a VMS database 203, a task allocation module 204, a role verification module 206, an error detection module 208, and a performance module 210. The vehicle connection module 202 is configured to identify a selected vehicle 100 from among the vehicles 100 based on a vehicle identifier of the selected vehicle. In one form, the vehicles 100 are configured to transmit an introduction signal that includes data indicative of the vehicle identifier for the vehicle 100. The vehicle connection module 202 is configured to process the introduction signal and authenticate the vehicle identifier from the selected vehicle. More particularly, using the vehicle identifier, the vehicle connection module 202 is configured to determine whether the vehicle information database 112 includes information related to the selected vehicle 100 and obtain the task order for the selected vehicle. The vehicle connection module 202 stores information related to the selected vehicle, such as, but not limited to, the vehicle identifier, communication ID, and EID, in the VMS database 203. Thus, the VMS 104 is configured to identify and track vehicles 100 attempting to communicate with the system 102.

In one form, for a wireless communication link, the vehicle connection module 202 is further configured to determine a communication quality of the wireless communication link with the selected vehicle, where the communication quality of the wireless communication link includes signal strength of the selected vehicle. If the communication quality is abnormal (e.g., slow, intermittent), the vehicle connection module 202 is configured to perform a corrective control. The corrective control may include, but is not limited to, disconnecting communication via the abnormal wireless communication link and establishing another (i.e., second) wireless communication link with the selected vehicle, generating a report including information regarding the wireless communication link being abnormal, or a combination thereof. In a non-limiting example, to assess the communication quality, the vehicle connection module 202 may ping the selected vehicle 100 and monitor how long it take for the selected vehicle 100 to respond. If the measured time period exceeds a desired time threshold, the vehicle connection module 202 determines that the communication quality is abnormal.

Once the selected vehicle 100 is identified, the task allocation module 204 is configured to obtain the task order for the selected vehicle 100 and provide the task order for the selected vehicle 100 to the task scheduling controller of the TMS 106. More particularly, in one form, the task allocation module 204 acquires the task order from the vehicle information database 112 based on the vehicle identifier. The task allocation module 204 sends the task order and the vehicle identifier to the TSC 108 for scheduling with a TEC 110. In a non-limiting example, using a wireless communication link, the task allocation module 204 is configured to employ IP protocol to establish communication with the selected vehicle 100 and the TMS 106, so that the TMS 106 may execute the task orders for the selected vehicle. In one form, the task allocation module 204 is configured to provide a scheduling recommendation for the task order and the selected vehicle to the TSC 108. For example, the task allocation module 204 identifies one or more stations that vehicle 100 is to be at for the one or more tasks and/or the task to be executed to determine when the selected vehicle should be scheduled with the TEC.

The error detection module 208 is configured to verify identity of the selected vehicle. For example, based on data in the VMS database 203, the error detection module 208 is configured to determine whether the vehicle identifier of the selected vehicle 100 matches with another vehicle 100. Specifically, in one form, the error detection module 208 is configured to compare the vehicle identifier of the selected vehicle 100 with vehicle identifiers of other vehicles 100 to verify that only one vehicle 100 among the plurality of vehicles 100 has the unique vehicle identifier. If the vehicle identifier of the selected vehicle 100 is associated with another vehicle, the error detection module 208 is configured to inhibit execution of the task order for the selected vehicle 100 and the other vehicle 100 that has the same vehicle identifier. Accordingly, the error detection module 208 does not assign the task order of the selected vehicle 100 to the TSC 108 and may further, notify the user via the computing device 114.

In another example, the error detection module 208 is configured to determine whether the vehicle identifier of the selected vehicle 100 is associated with another communication ID. Specifically, the error detection module 208 is configured to determine if the vehicle identifier of the selected vehicle 100 is associated with two or more communication ID or with a communication ID different from the one currently stored. If the selected vehicles 100 is associated with two different communication IDs, the error detection module 208 performs a corrective action such as notifying the TMS 106, notifying the user, among others. If the communication ID previously stored in the VMS database 203 is different from the communication ID used by the TSC 108, the error detection module 208 updates the communication ID for the selected vehicle in the VMS database 203.

The role verification module 206 is configured to provide a role identification (ID) information used to determine whether the VMS 104 is a primary VMS or an auxiliary VMS. More particularly, in one form, the system 102 may include two or more VMSs 104, where one VMS 104 is provided as the primary VMS (e.g., VMS 104-A) for communicating with the vehicle 100 and assigning the task order, while the other VMS(s) 104 are provided as auxiliary VMS (e.g., VMS 104-B). The auxiliary VMS does not communicate with the vehicles 100 until the respective auxiliary VMS is identified as the new primary VMS when the original primary VMS is deactivated due to abnormal operation, health-maintenance check, or other suitable condition in which the original primary VMS cannot perform its duties. The role ID information is a unique identifier assigned to the VMS 104, and may include a unique character string or other type of identifier.

The performance module 210 is configured to monitor operation and performance of the TSC 108, the TEC 110, the vehicles 100, or a combination thereof. In one form, the performance module 210 is configured to ping the TSC 108 to request information related to operation of the TSC 108, operation of the TEC 110, and/or the execution of the task order for the selected vehicle 100. For example, the TSC 108 may provide information related to its processor, memory, and other components. In another example, the TSC 108 may notify the performance module 210 if the TEC 110 is not operating and, thus cannot perform the tasks. In response to the abnormal operation of the TSC 108 and/or TEC 110, the performance module 210 may notify the user via the computing device, store information related to the abnormal operation, and/or perform other suitable corrective action.

The task managing system (TMS) is configured to manage and execute the task orders for the vehicles 100. Each TEC 110 is configured to communicate with a set of vehicles 100 (e.g., one or more vehicles 100) from among the one or more vehicles 100. In a non-limiting example, the TEC 110 are configured to communicate with two or more vehicles 100, such that the TEC 110 is able to execute tasks for two or more vehicles 100 at a time. The number of vehicle 100 that the TEC 110 is able communicate is provided as a communication instance. An example of such a TEC is disclosed in Applicant's co-pending application titled "TASK MANAGING SYSTEM HAVING MULTIPLE TASK EXECUTION CONTROLLERS FOR TESTING-CONFIGURING VEHICLES AND METHOD THEREOF", as filed in U.S. patent application Ser. No. 17/572,819 on Jan. 11, 2022, which is commonly owned with the present application and the contents of which are incorporated herein by reference in its entirety. In this example, the TEC 110 processes the task order to obtain data indicative of the vehicle identifier and the tasks to be performs. For example, each task may be associated with a unique identifier. In an example application, the TEC 110 establishes a communication link with the selected vehicle based on the vehicle identifier and the communication ID and begin to execute the tasks. Once complete, the TEC 110 is configured to generate a report indicative the completion of the task order and provides the report to the TSC 108. The software programs employed for the various tasks may be stored with each TEC 110, a separate server accessible by the TEC 110, and/or the TSC 108.

While four TECs are illustrated, the TMS 106 may include any number of TECs (i.e., 2 or more). In addition, in an example application, the TECs 110 may be grouped in clusters 220-1 and 220-2 (collectively "clusters 220"), where each cluster 220 includes at least two TECs 110 and provided in a machine unit (e.g., a server). In one form, each TEC 110 includes a set of communication nodes 224 (i.e., one or more nodes), where each communication nodes 224 is configured to communicate with a respective vehicle. Thus, a single TEC 110 is able to communicate with multiple vehicles to execute respective task orders for the vehicles 100. It should be readily understood that the depiction of the communication nodes 224 is for illustration purposes only and does not reflect the node as implemented in the TEC 110.

In one form, TSC 108 is communicably coupled to the VMS 104 to acquire the task order, which includes information related to tasks to be performed and the selected vehicle 100 (e.g., vehicle identifier, communication ID, among other information for identifying and communicating with the vehicle 100). An example of such a TSC is disclosed in Applicant's co-pending application titled "TASK MANAGING SYSTEM FOR TESTING-CONFIGURING VEHICLES BASED ON A TASK ORDER AND METHOD THEREOF," which is commonly owned with the present application and the contents of which are incorporated herein by reference in its entirety. The TSC 108 assigns the selected vehicle 100 to a selected TEC 110 (e.g., the selected TEC may also be denoted by reference number "110-1A") from among the TEC 110 based on the availability of the TEC 110. For example, the TSC 108 may ping the TECs 110 to request information related to the number of communication instances available and/or unavailable.

As provided above, the system 102 may include more than one VMS 104, and the TSC 108 is configured to assign one of the VMS 104 as the primary VMS and the other VMSs 104 as the auxiliary VMS. Specifically, in one form, the TSC 108 tracks VMS ID information for the VMSs 104. The TSC 108 associates the VMS ID information of the selected VMS 104 as being the primary VMS and the other VMS ID information as being auxiliary VMS(s). The TSC 108 then transmits a role notification that identifies the respective VMS as a primary VMS or an auxiliary VMS, which is processed by the role verification module 206. In some applications, the role verification module 206 may confer whether the respective VMS 104 is a primary VMS or an auxiliary VMS by transmitting a role ID message having the VMS ID information for the respective VMS 104 to the TSC 108. In response to the role ID message, the TSC 108 transmits the role notification to the VMS. In one form, the TSC 108 assigns a VMS as a primary based on which VMSs communicated first (i.e., first VMS in contact is primary) and the other VMS(s) are auxiliary. The TSC 108 may be configured in various suitable ways for selecting the primary VMS, and should not be limited to the example provided herein.

Figure 3:
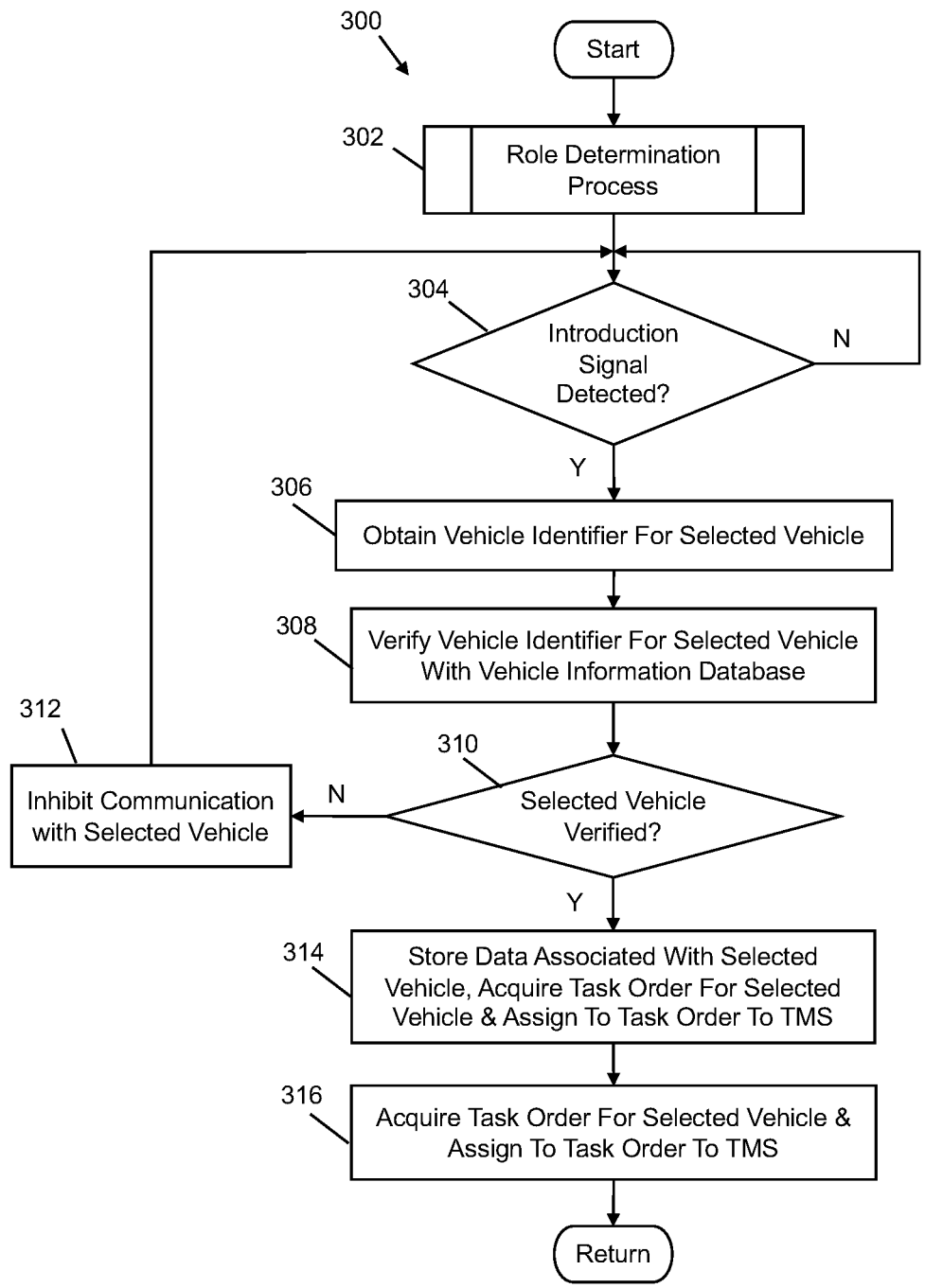
FIG. 3 is a flowchart of an example vehicle management routine, in accordance with the teachings of the present disclosure.
Figure 4:
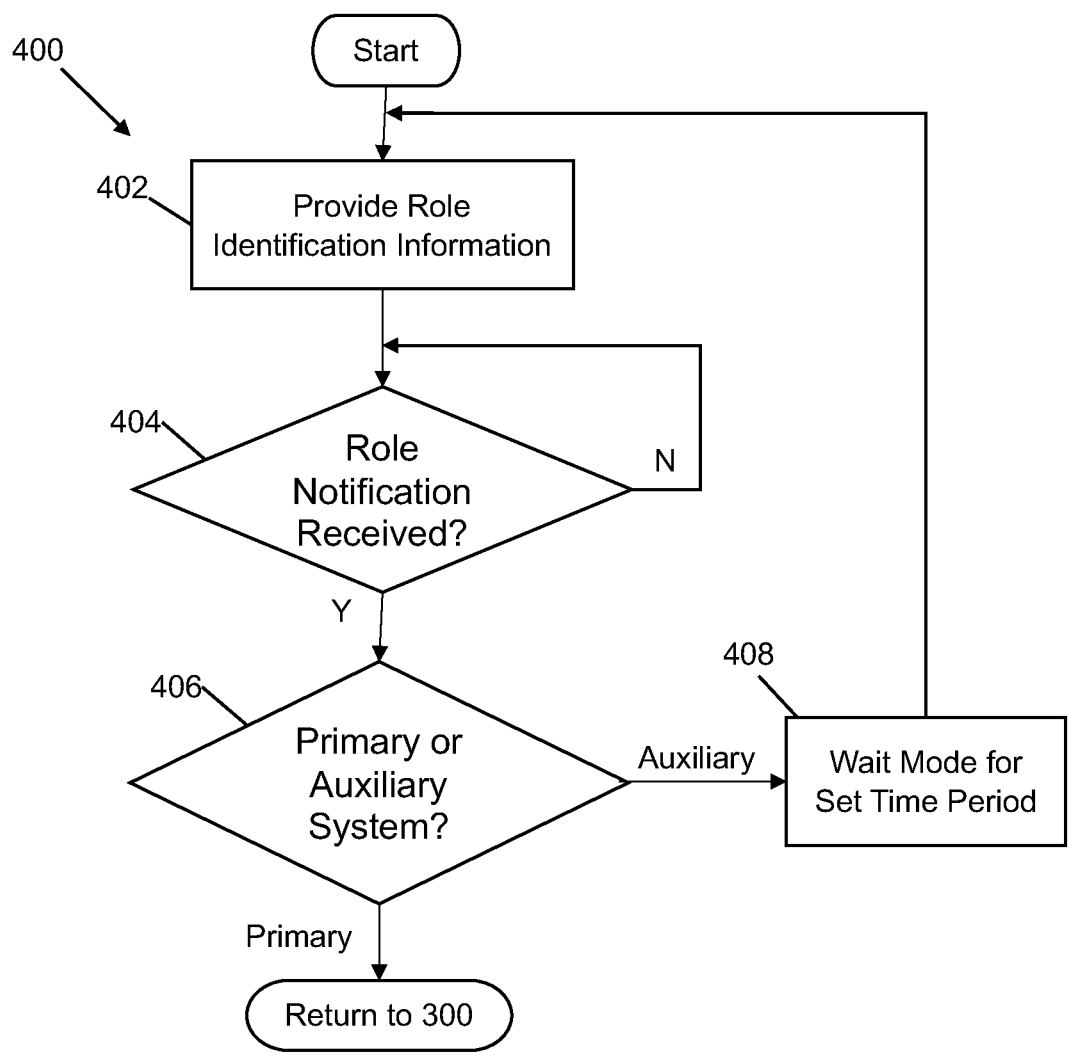
FIG. 4 is a flowchart of a role verification routine 400, in accordance with the teachings of the present disclosure.

Referring to FIGS. 3 and 4, flowcharts of an example vehicle management routine 300 and a role verification routine 400 executed by the VMS is provided, respectively. At 302, the VMS performs the role determination process to determine whether the VMS is an auxiliary or primary VMS. It should be readily understood, that if the system include only one VMS, the role determination process may be omitted from the routine 300.

At 402 the VMS provides a role ID message having its VMS ID information to the TMS 106. In another form, the TMS may requests the VMS to provide the VMS ID information. At 404, the VMS determines if the role notification is received. If not, the VMS waits until it does. Alternatively, the VMS may wait a defined period of time and then resend the role ID message. If received, the VMS determines whether it is a primary or auxiliary system based on the data in the role notification, at 406. If an auxiliary system, the VMS is placed in wait mode for a time period before returning to 402, at 408. If a primary system, the VMS returns to the routine 300 at 304. It should be readily understood, that if the system include only one VMS, the role determination process may be omitted from the routine 300.

As the primary, the VMS processes vehicles in communication with the system. More particularly, in one form, the VMS determines whether an introduction signal is detected, at 304. If not, the VMS waits for such signal. Once detected, the VMS obtains the vehicle identifier provided in the introduction signal for the selected vehicle, at 306 and verifies the vehicle identifier with data in the vehicle information database, at 308. More particularly, the VMS compares the vehicle identifier of the selected vehicle with vehicle identifiers stored by the vehicle information database. If there is no, match the vehicle identifier is not verified and the VMS inhibits communication with the selected vehicle at 312. The VMS may also issue notification to the user of the unidentified vehicle. if the there is a match, the VMS stores data associated with the selected vehicle, at 314. For example, the VMS stores the vehicle identifier, the communication ID, and other information provided in the introductions signal. At 316, the VMS then acquires the task order for the selected vehicle from the vehicle information database and assign the task order to the TMS for further processing and executions of the tasks in the task order.

It should be readily understood that routines 300 and 400 are provided as example routines and may be configured in other suitable ways. In addition, the VMS may include additional routines for detecting errors with respect to the vehicles and/or the communication link between the vehicles and the system, and monitoring operation state of the TMS, as described above with respect to the error detection module 208 and performance detection module.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system comprising:
a vehicle managing system (VMS) configured to communicate to a selected vehicle among one or more vehicles, the VMS including a processor configured to execute instructions stored in a non-transitory computer-readable medium to operate as:
a vehicle connection module configured to identify the selected vehicle based on an introduction signal received from the selected vehicle, and wherein the introduction signal includes a vehicle identifier comprising at least one of a vehicle identification number, an entity identification, and a communication identification;
a task allocation module configured to obtain a task order associated with the selected vehicle, wherein the task order defines one or more tasks to be performed on the selected vehicle, and wherein the task order is obtained based on the identification of the selected vehicle;
a task managing system including a plurality of task execution controllers, a task scheduling controller, and an error detection module, wherein:
the task allocation module of the VMS is configured to provide the task order for the selected vehicle to the task scheduling controller,
the error detection module is configured to determine whether the vehicle identifier of the selected vehicle matches a vehicle identifier of a different vehicle from among the one or more vehicles,
the task scheduling controller is configured to assign the task order to a selected task execution controller from among the plurality of task execution controllers based on availabilities of the plurality of task execution controllers and the vehicle identifier of the selected vehicle not matching the vehicle identifier of the different vehicle, and
the selected task execution controller is configured to execute the task order for the selected vehicle.

2. The system of claim 1, wherein the vehicle connection module is further configured to:
process the introduction signal; and
authenticate the vehicle identifier for the selected vehicle based on the introduction signal associated with the selected vehicle and data from a vehicle information database, wherein the vehicle information database is configured to store data related to the one or more vehicles including the vehicle identifier and the task order.

3. The system of claim 2, wherein the vehicle managing system is configured to communicate with the selected vehicle via wireless communication link, and the vehicle connection module is further configured to:
determine a communication quality of the wireless communication link with the selected vehicle, wherein the communication quality of the wireless communication link includes a signal strength of the selected vehicle; and
output a corrective control in response to the communication quality being abnormal.

4. The system of claim 3, wherein the vehicle connection module is further configured to, as the corrective control:
disconnect communication with the selected vehicle via the wireless communication link and establish another wireless communication link with the selected vehicle;
generate a report including information regarding the wireless communication link being abnormal; or
a combination thereof.

5. The system of claim 1, wherein:
the task scheduling controller is configured to provide data indicative of an operation state of the task managing system to the VMS, and
the processor of the VMS is further configured to operate as a performance module configured to:
determine occurrence of an abnormal operation of the task managing system based on the operations state of the task managing system, and execute a corrective action in response to the abnormal operation of the task managing system.

6. The system of claim 5, wherein the data of the operation state includes data regarding an operation state of the task scheduling controller, an operation state of the task execution controllers, a state of the execution of the task order of the selected vehicle, or a combination thereof.

7. The system of claim 1, wherein the processor of the VMS is further configured to operate as a role verification module configured to provide a role identification information to identify the VMS as a primary system or an auxiliary system to the task scheduling controller.

8. The system of claim 7, wherein:
the role verification module is configured to receive a role notification including information identifying the VMS as one of the primary system or the auxiliary system from the task scheduling controller,
the task allocation module is configured to provide the task order for the selected vehicle to the task scheduling controller in response to being the primary system; and
the role verification module is configured to have the VMS in a wait mode in response to the VMS being the auxiliary system.

9. The system of claim 1, wherein the processor of the VMS is further configured to operate as:
the error detection module configured to:
determine whether at least one of the vehicle identifier or an internet protocol address for the selected vehicle changed since establishing a wireless communication link with the selected vehicle; and
output a corrective action based on an identified change in the vehicle identifier, the internet protocol address, or a combination thereof.

10. The system of claim 1, wherein the
error detection module is further configured to:
inhibit execution of the task order in response to the vehicle identifier of the selected vehicle and the vehicle identifier of the second vehicle matching.

11. A method of managing one or more vehicles to be tested-configured, the method comprising:
establishing, by a vehicle managing system (VMS), a communication link with a selected vehicle among the one or more vehicles;
identifying, by the VMS, the selected vehicle based on an introduction signal received from the selected vehicle, and wherein the introduction signal includes a vehicle identifier comprising at least one of a vehicle identification number, an entity identification, and a communication identification;
obtaining, by the VMS, a task order associated with the selected vehicle, wherein the task order defines one or more tasks to be executed on the selected vehicle, and wherein the task order is obtained based on the identification of the selected vehicle;
providing, by the VMS, the task order for the selected vehicle to a task scheduling controller;
determining whether the vehicle identifier of the selected vehicle matches a vehicle identifier of a different vehicle from among the one or more vehicles;
assigning, by the task scheduling controller, the task order to a selected task execution controller from among a plurality of task execution controllers based on availabilities of the plurality of task execution controllers and the vehicle identifier of the selected vehicle not matching the vehicle identifier of the different vehicle, wherein each of the plurality of task execution controllers is configured to wirelessly communicate with a set of vehicles from among the one or more vehicles; and
executing, by the selected task execution controller, the task order for the selected vehicle.

12. The method of claim 11 further comprising:
detecting, by the VMS, the introduction signal; and
authenticating, by the VMS, the vehicle identifier of the selected vehicle based on the introduction signal associated with the selected vehicle and data from a vehicle information database, wherein the vehicle information database is configured to store data related to the one or more vehicles including the vehicle identifier and the task order.

13. The method of claim 12 further comprising:
determining, by the VMS, a communication quality of the wireless communication link with the selected vehicle, wherein the communication quality of the wireless communication link includes a signal strength; and
outputting a corrective control in response to the communication quality being abnormal.

14. The method of claim 13, wherein outputting the corrective control further comprises at least one of:
disconnecting communication with the selected vehicle via the wireless communication link and establishing, by the VMS, another wireless communication link with the selected vehicle; or
generating, by the VMS, a report including information regarding the wireless communication link being abnormal.

15. The method of claim 11 further comprising providing, by the VMS, a role identification information to identify VMS as a primary system or an auxiliary system to the task scheduling controller.

16. The method of claim 15 further comprising:
obtaining, by the VMS, a role notification including information identifying the VMS as one of the primary system or the auxiliary system from the task scheduling controller, wherein the VMS provides the task order for the selected vehicle in response to being the primary system; and
operating, by the VMS, in a wait mode in response to the VMS being the auxiliary system.

17. The method of claim 11 further comprising:
determining, by the VMS, whether at least one of the vehicle identifier or an internet protocol address for the selected vehicle changed since establishing the wireless communication link with the selected vehicle; and
outputting, by the VMS, a corrective action based on an identified change in the vehicle identifier, the internet protocol address, or a combination thereof.

18. The method of claim 11 further comprising:
determining, by the VMS, whether the vehicle identifier of the selected vehicle matches a vehicle identifier of a second vehicle from among the one or more of vehicles; and
inhibiting, by the VMS, execution of the task order in response to the vehicle identifier of the selected vehicle and the vehicle identifier of the second vehicle matching.

19. A system comprising:
a vehicle managing system (VMS) configured to wirelessly communicate to one or more vehicles via one or more wireless communication link, the VMS including a processor configured to execute instructions stored in a non-transitory computer-readable medium to operate as:

a vehicle connection module configured to process an introduction signal associated with the one or more vehicles and identify a selected vehicle among the one or more vehicles based on the introduction signal and data from a vehicle information database, wherein the introduction signal is received from the selected vehicle and includes data indicative of the vehicle identifier for the selected vehicle and the vehicle information database is configured to store data related to the one or more vehicles including a vehicle identifier and a task order; and a task allocation module configured to obtain the task order associated with the selected vehicle from the vehicle information database, wherein the task order defines one or more tasks to be executed on the selected vehicle, and wherein the task order is obtained based on the identification of the selected vehicle; and a task managing system including a plurality of task execution controllers a task scheduling controller, and an error detection module, wherein:

the task allocation module is configured to provide the task order for the selected vehicle to the task scheduling controller, the error detection module is configured to determine whether the vehicle identifier of the selected vehicle matches a vehicle identifier of a different vehicle from among the one or more vehicles, the task scheduling controller is configured to assign the selected vehicle to a selected task execution controller from among the plurality of task execution controllers based on availabilities of the plurality of task execution controllers and the vehicle identifier of the selected vehicle not matching the vehicle identifier of the different vehicle, and the selected task execution controller is configured to execute the one or more tasks of the task order on the selected vehicle.

20. The system of claim 19, wherein the processor of the VMS is further configured to operate as:

the error detection module configured to:
determine whether the vehicle identifier of the selected vehicle matches a vehicle identifier of a second vehicle from among the one or more of vehicles; and
inhibit execution of the task order in response to the vehicle identifier of the selected vehicle and the vehicle identifier of the second vehicle matching.

* * * * *